US011101950B2

(12) United States Patent
Manolakos et al.

(10) Patent No.: US 11,101,950 B2
(45) Date of Patent: Aug. 24, 2021

(54) DEMODULATION REFERENCE SIGNAL (DMRS) BUNDLING IN SLOT AGGREGATION AND SLOT FORMAT CONSIDERATIONS FOR NEW RADIO

(71) Applicant: QUALCOMM Incorporated, San Diego, CA (US)

(72) Inventors: Alexandras Manolakos, San Diego, CA (US); Wooseok Nam, San Diego, CA (US); Heechoon Lee, San Diego, CA (US); Wanshi Chen, San Diego, CA (US); Tao Luo, San Diego, CA (US); Peter Gaal, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/246,207

(22) Filed: Jan. 11, 2019

(65) Prior Publication Data

US 2019/0222380 A1    Jul. 18, 2019

Related U.S. Application Data

(60) Provisional application No. 62/671,671, filed on May 15, 2018, provisional application No. 62/616,877, filed on Jan. 12, 2018.

(51) Int. Cl.
*H04L 5/00* (2006.01)
*H04L 25/02* (2006.01)
(Continued)

(52) U.S. Cl.
CPC .............. *H04L 5/0048* (2013.01); *H04L 1/08* (2013.01); *H04L 5/0051* (2013.01);
(Continued)

(58) Field of Classification Search
CPC ... H04L 5/0048; H04L 5/0023; H04L 5/0051; H04L 5/0083; H04L 5/0094;
(Continued)

(56) References Cited

U.S. PATENT DOCUMENTS

| 6,009,468 A * | 12/1999 | Lau ..................... H04L 12/2801 |
| | | 370/444 |
| 2012/0188976 A1* | 7/2012 | Kim .................. H04W 72/1289 |
| | | 370/329 |

(Continued)

OTHER PUBLICATIONS

3GPP TS 36.213, Evolved Universal Terrestrial Radio Access (E-UTRA); Physical layer procedures, Release 9, Mar. 2010 (Year: 2010).*

(Continued)

*Primary Examiner* — Un C Cho
*Assistant Examiner* — Peter K Mak
(74) *Attorney, Agent, or Firm* — Patterson + Sheridan, LLP

(57) ABSTRACT

Certain aspects of the present disclosure relate to communication systems, and more particularly, to techniques for time domain bundling of demodulation reference signals (DMRSs) in slot aggregation. An exemplary method generally includes detecting one or more conditions in at least one of a plurality of aggregated slots that indicate the at least one of the aggregated slots is not configured as a downlink-only slot, wherein each slot comprises a plurality of symbols, in response to the detection, determining whether to bundle demodulation reference signals (DMRSs) received across one or more of the aggregated slots, and performing channel estimation based on the determination.

22 Claims, 12 Drawing Sheets

(51) Int. Cl.

| | | |
|---|---|---|
| *H04W 76/27* | (2018.01) | |
| *H04W 72/12* | (2009.01) | |
| *H04W 72/04* | (2009.01) | |
| *H04L 1/08* | (2006.01) | |
| *H04L 5/14* | (2006.01) | |
| *H04W 72/14* | (2009.01) | |

(52) U.S. Cl.
CPC .......... *H04L 5/0094* (2013.01); *H04L 5/1469* (2013.01); *H04L 25/0202* (2013.01); *H04L 25/0224* (2013.01); *H04W 72/048* (2013.01); *H04W 72/1289* (2013.01); *H04W 72/14* (2013.01); *H04W 76/27* (2018.02); *H04L 5/0055* (2013.01); *H04W 72/0446* (2013.01)

(58) Field of Classification Search
CPC .......... H04L 25/0202; H04W 72/1289; H04W 72/14; H04W 76/27; H04W 72/0446
See application file for complete search history.

(56) References Cited

U.S. PATENT DOCUMENTS

| | | | |
|---|---|---|---|
| 2016/0212750 | A1 | 7/2016 | Xu et al. |
| 2017/0019911 | A1 | 1/2017 | Rico Alvarino et al. |
| 2018/0278395 | A1* | 9/2018 | Yoon ................ H04L 5/0051 |
| 2018/0278454 | A1* | 9/2018 | Islam ................ H04L 5/0073 |
| 2018/0279274 | A1* | 9/2018 | Sun .................. H04L 5/0053 |
| 2018/0324760 | A1 | 11/2018 | Yuk et al. |
| 2019/0013912 | A1 | 1/2019 | Tomeba et al. |
| 2019/0104532 | A1* | 4/2019 | Park ................. H04L 5/0048 |
| 2019/0141695 | A1* | 5/2019 | Babaei ............... H04L 5/001 |
| 2019/0141698 | A1* | 5/2019 | Kim ................. H04W 72/0413 |
| 2019/0174323 | A1 | 6/2019 | Go et al. |
| 2019/0245648 | A1* | 8/2019 | Jo ...................... H04L 5/00 |
| 2020/0146032 | A1* | 5/2020 | Bae .................. H04W 72/1268 |
| 2020/0229231 | A1* | 7/2020 | Oh ................... H04W 80/08 |
| 2020/0280337 | A1* | 9/2020 | Yi .................... H04B 1/7143 |

OTHER PUBLICATIONS

3GPP TS 138.211, V15.0 Physical channel and modulation for PUSCH (Year: 2018).*

Huawei: "Discussion of Ue Categories and Capabilities," 3GPP Draft; R4-102053, 3rd Generation Partnership Project (3GPP), Mobile Competence Centre; 650, Route Des Lucioles; F-06921 Sophia-Antipolis Cedex; France, vol. RAN WG4, No. Montreal, Canada; May 10, 2010, May 20,2010, XP050426988, 4 pages, [retrieved on May 20, 2010] p. 2.

International Search Report and Written Opinion—PCT/US2019/013397—ISA/EPO—dated Jun. 18, 2019.

Qualcomm Incorporated: "DL/UL Scheduling, Processing Time and HARQ Management", 3GPP Draft; R1-1720688 Scheduling-Processing-Harqmgmt, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017, Nov. 18, 2017, XP051370149, 12 Pages, Retrieved from the Internet: URL: http://www.3gpp.org/ftp/tsg%5Fran/WG1%5FRL1/TSGR1%5F91/Docs/ [retrieved on Nov. 18, 2017].

Qualcomm Incorporated: "Summary of DL/UL Scheduling and HARQ Management," 3GPP Draft; R1-1721703_Summary_7_3.3.2_V10, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017, Dec. 4, 2017, XP051370781, 14 pages, Retrieved from the Internet: URL: http://www.3gpp.org/ftp/tsg%5FranWG1%5FRL1/TSGR1%5F91/Docs/ [retrieved on Dec. 4, 2017].

Huawei et al., "Design of Dmrs for DL/UL Data Transmission", 3GPP Draft; R1-1715472, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18, 2017-Sep. 21, 2017 Sep. 17, 2017, XP051338940, Retrieved from the Internet: URL:http://www.3gpp.org/ftp/Meetings_3GPP_SYNC/RAN1/Docs/ [retrieved on Sep. 17, 2017], 16 pages.

Partial International Search Report—PCT/US2019/013397—ISA/EPO—dated Apr. 2, 2019.

Vivo: "Discussion on Rate Matching for DL and UL", 3GPP Draft; R1-1717482_Discussion on Rate Matching for DL and UL, 3rd Generation Partnership Project (3GPP), Mobile Competence Centre; 650, Route Des Lucioles; F-06921 Sophia-Antipolis Cedex; France, vol. RAN WG1, No. Prague, CX; Oct. 9, 2017-Oct. 13, 2017 Oct. 8, 2017 (Oct. 8, 2017), XP051340670, Retrieved from the Internet: URL:http://www.3gpp.org/ftp/Meetings_3GPP_SYNC/RAN1/Docs/ [retrieved on Oct. 8, 2017], 5 pages.

* cited by examiner

|   | 0 | 1 | 2 | 3 | 4 | 5 | 6 | 7 | 8 | 9 | 10 | 11 | 12 | 13 |
|---|---|---|---|---|---|---|---|---|---|---|----|----|----|----|
| 802 → | D/L | D/L | X | X | X | X | X | X | X | X | X | X | X | X |
| 804 → | D/L | D/L | D/L | D/L | D/L | D/L | D/L | D/L | D/L | X | X | X | X | X |
| 806 → | D/L | D/L | D/L | D/L | D/L | D/L | D/L | D/L | D/L | X | X | X | U/L | U/L |

DEMODULATION REFERENCE SIGNAL (DMRS) BUNDLING IN SLOT AGGREGATION AND SLOT FORMAT CONSIDERATIONS FOR NEW RADIO

CLAIM OF PRIORITY UNDER 35 U.S.C. § 119

This application claims benefit of U.S. Provisional Patent Application Ser. Nos. 62/616,877 and 62/671,671, filed Jan. 12, 2018 and May 15, 2018, respectively, which are both herein incorporated by reference in their entirety.

FIELD

The present disclosure relates generally to wireless communication systems, and more particularly, to techniques for bundling demodulation reference signals (DMRSs) across one or more aggregated time slots.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an evolved Node B (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio BS (NR NB), a network node, 5G NB, eNB, a Next Generation NB (gNB), etc.). A BS or DU may communicate with a set of UEs on downlink channels (e.g., for transmissions from a BS or to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE). The method generally includes detecting one or more conditions in at least one of a plurality of aggregated time slots that indicate the at least one of the aggregated time slots is not configured as a downlink-only time slot. Each time slot includes a plurality of symbols. The method also includes, in response to the detection, determining whether to bundle demodulation reference signals (DMRSs) received across one or more of the aggregated time slots. The method further includes performing channel estimation based on the determination.

Certain aspects provide an apparatus for wireless communication. The apparatus includes means for detecting one or more conditions in at least one of a plurality of aggregated time slots that indicate the at least one of the aggregated time slots is not configured as a downlink-only time slot. Each time slot includes a plurality of symbols. The apparatus also includes means for determining, in response to the detection, whether to bundle demodulation reference signals (DMRSs) received across one or more of the aggregated time slots. The apparatus further includes means for performing channel estimation based on the determination.

Certain aspects provide an apparatus for wireless communication. The apparatus generally includes at least one processor and a memory coupled to the at least one processor. The at least one processor is configured to detect one or more conditions in at least one of a plurality of aggregated time slots that indicate the at least one of the aggregated time slots is not configured as a downlink-only time slot. Each time slot includes a plurality of symbols. The at least one processor is also configured to determine, in response to the detection, whether to bundle demodulation reference signals (DMRSs) received across one or more of the aggregated time slots. The at least one processor is further configured to perform channel estimation based on the determination.

Certain aspects provide a non-transitory computer-readable medium for wireless communications by a user equipment (UE). The non-transitory computer-readable medium generally includes instructions that, when executed by at least one processor, configure the at least one processor to detect one or more conditions in at least one of a plurality of aggregated time slots that indicate the at least one of the aggregated time slots is not configured as a downlink-only time slot. Each time slot includes a plurality of symbols. The non-transitory computer-readable medium also includes instructions that configure the at least one processor to determine, in response to the detection, whether to bundle demodulation reference signals (DMRSs) received across one or more of the aggregated time slots. The non-transitory computer-readable medium also includes instructions that configure the at least one processor to perform channel estimation based on the determination.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 8 illustrates an example of how the transmission direction for a symbol can be overwritten by one or more assignment schemes, in accordance with certain aspects of the present disclosure.

FIG. 12 illustrates an example semi-static assignment and initial slot format for one or more slots, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
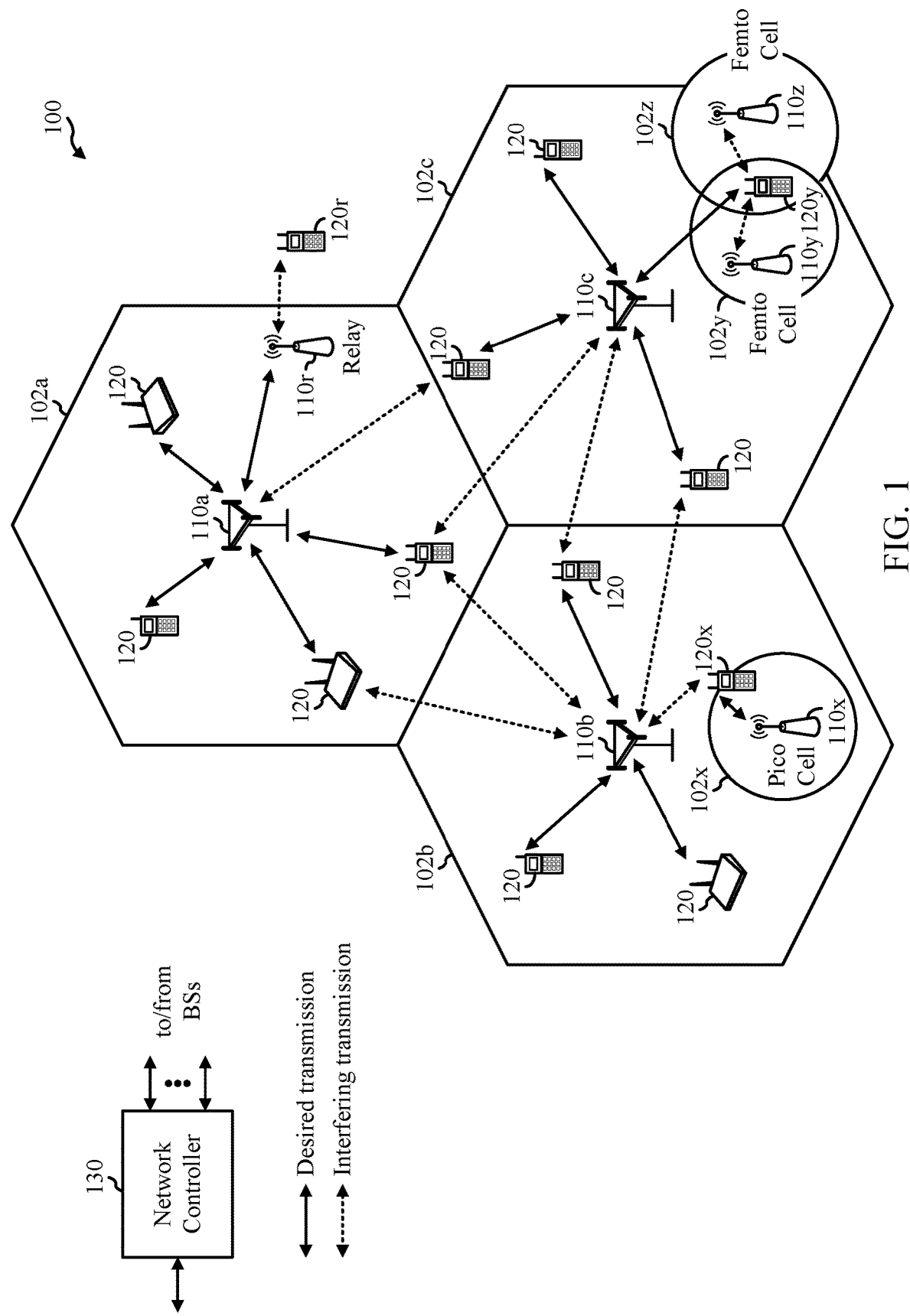
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 27 GHz or beyond), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

Some systems, such as NR (Rel-15), may support bundling of demodulation reference signals (DMRSs) in the time domain across one or more time slots. That is, when DMRS bundling is configured, the UE may perform (joint) channel estimation based on DMRS(s) received across multiple slots, as opposed to performing channel estimation separately for each individual slot based on the DMRS(s) received in that slot. In one reference example, NR may support time domain bundling of DMRS with slot aggregation of DL-only slots. In slot aggregation, the UE may receive an indication (e.g., parameter(s) in the downlink grant) that the same symbol allocation is applied across the aggregated consecutive slots.

However, in some cases, the gNB may dynamically change the slot format (of one or more of the aggregated slots) via a slot format indication (SFI). That is, the SFI can dynamically change the transmission direction of one or more symbols in the aggregated slots. In such cases, when DMRS bundling is configured, there may be an ambiguity regarding how time-domain DMRS bundling is affected by the dynamic change of the slot format. That is, the UE may not know whether to perform DMRS bundling, which slots to perform DMRS bundling for, etc. if the transmission direction of a symbol in a slot changes, e.g., after the grant has been received.

Accordingly, aspects provide techniques and apparatus that enable the UE to determine whether and/or how to perform DMRS bundling in situations where time-domain DMRS bundling is configured and the slot format of one or more aggregated slots dynamically changes. For example, using the techniques presented herein, a UE may detect one or more conditions in at least one time slot of multiple aggregated time slots that indicate the at least one time slot is not configured as a downlink-only time slot. In response to the detection, the UE can determine whether to bundle DMRSs received across one or more of the aggregated time slots.

In one example, the UE may determine to refrain from bundling DMRSs received in the time slot in which the one or more conditions are detected and any subsequent time slot of the aggregated time slots. In one example, the UE may determine to refrain from bundling DMRSs received in only the time slot in which the one or more conditions are detected. The UE may perform channel estimation based on the determination. In this manner, the techniques presented herein enable the UE to efficiently resolve ambiguities that may arise when time-domain DMRS bundling and dynamic slot format of slot-aggregation are supported (and enabled) in the system.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of base stations (BSs) 110 and other network entities. A BS may be a station that communicates with UEs. Each BS 110 may provide communication coverage for a particular geographic area. In 3GPP, the term "cell" can refer to a coverage area of a Node B and/or a NB subsystem serving this coverage area, depending on the context in which the term is used. In NR systems, the term "cell" and evolved NB (eNB), NB, 5G NB, Next Generation NB (gNB), access point (AP), BS, NR BS, 5G BS, or transmission reception point (TRP) may be interchangeable. In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) or narrowband IoT (NB-IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, subbands, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a resource block (RB)) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 RBs), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a BS) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2:
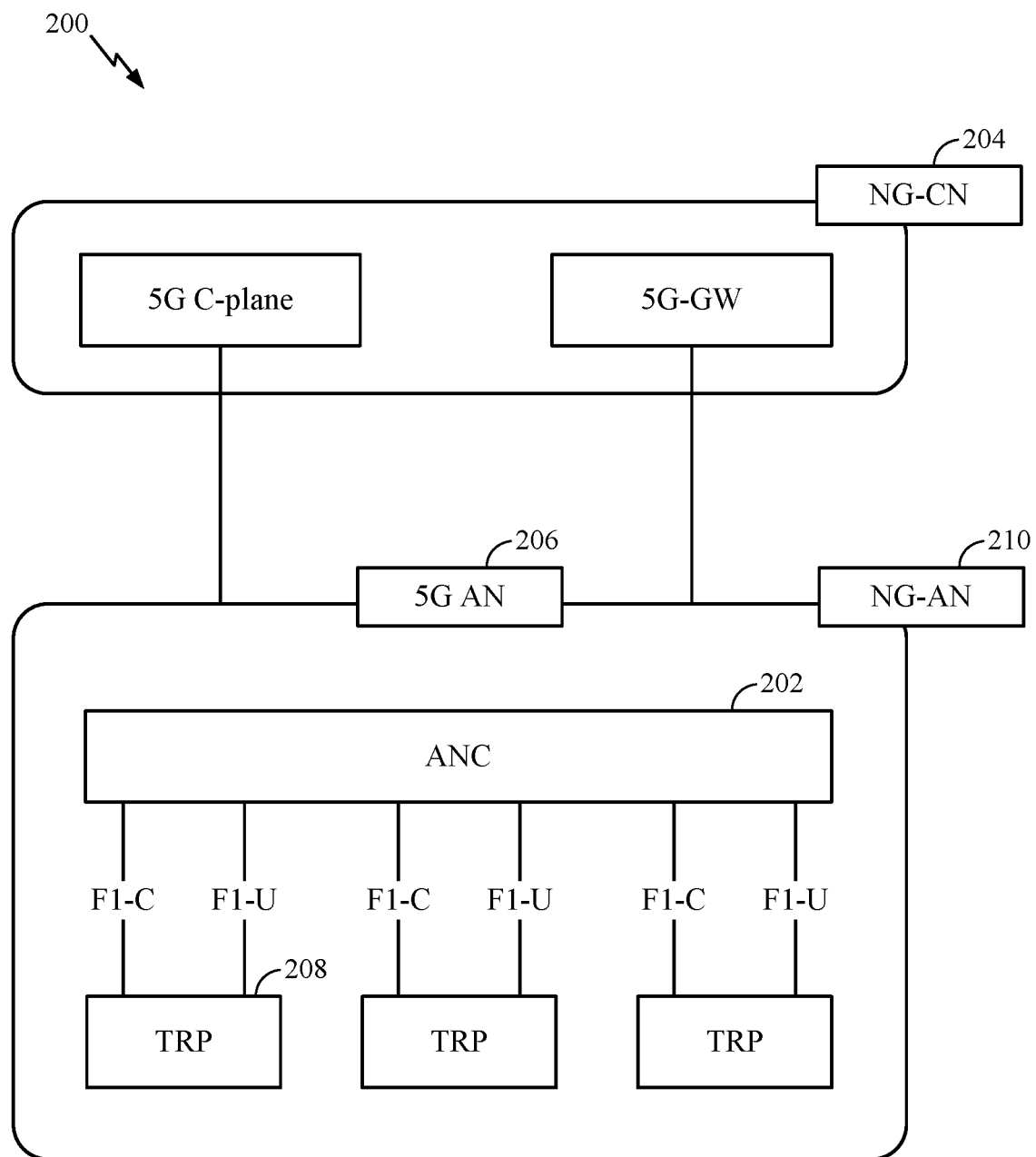
FIG. 2 is a block diagram illustrating an example logical architecture of a distributed radio access network (RAN), in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC 202 may be a central unit (CU) of the distributed RAN 200. The backhaul interface to the next generation core network (NG-CN) 204 may terminate at the ANC 202. The backhaul interface to neighboring next generation access nodes (NG-ANs) 210 may terminate at the ANC 202. The ANC 202 may include one or more TRPs 208. As described above, a TRP may be used interchangeably with "cell".

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP 208 may include one or more antenna ports. The TRPs may be configured to individually (e.g., dynamic selection) or jointly (e.g., joint transmission) serve traffic to a UE.

The logical architecture may support fronthauling solutions across different deployment types. For example, the logical architecture may be based on transmit network capabilities (e.g., bandwidth, latency, and/or jitter). The logical architecture may share features and/or components with LTE. The NG-AN 210 may support dual connectivity with NR. The NG-AN 210 may share a common fronthaul for LTE and NR. The logical architecture may enable cooperation between and among TRPs 208. For example, cooperation may be preset within a TRP and/or across TRPs via the ANC 202. An inter-TRP interface may not be present.

The logical architecture may have a dynamic configuration of split logical functions. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). A BS may include a central unit (CU) (e.g., ANC 202) and/or one or more distributed units (e.g., one or more TRPs 208).

Figure 3:
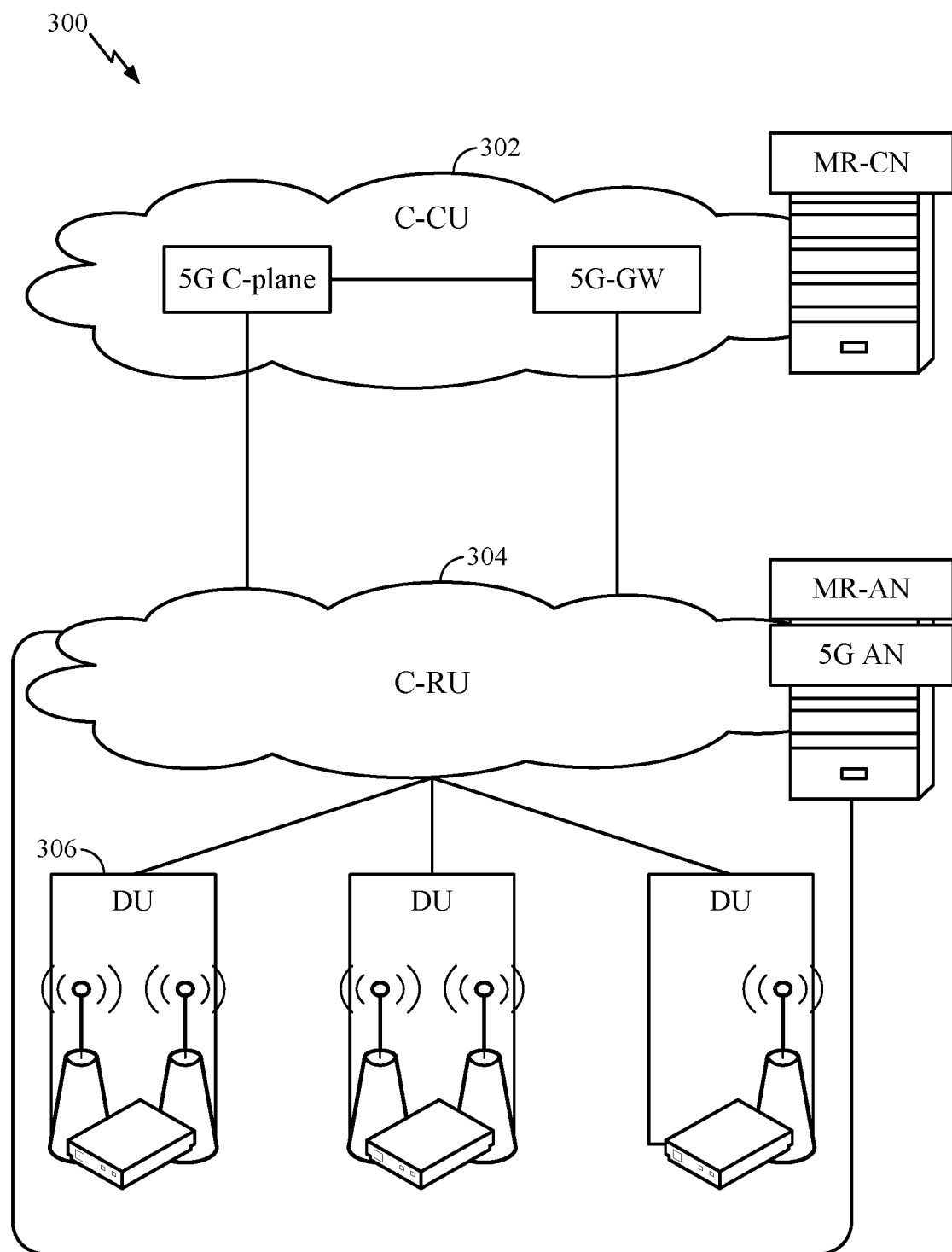
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU 302 may be centrally deployed. C-CU functionality may be offloaded (e.g., to advanced wireless services (AWS)), in an effort to handle peak capacity. A centralized RAN unit (C-RU) 304 may host one or more ANC functions. The C-RU 304 may host core network functions locally. The C-RU 304 may have distributed deployment. The C-RU 304 may be close to the network edge. A DU 306 may host one or more TRPs. The DU 306 may be located at edges of the network with radio frequency (RF) functionality.

Figure 4:
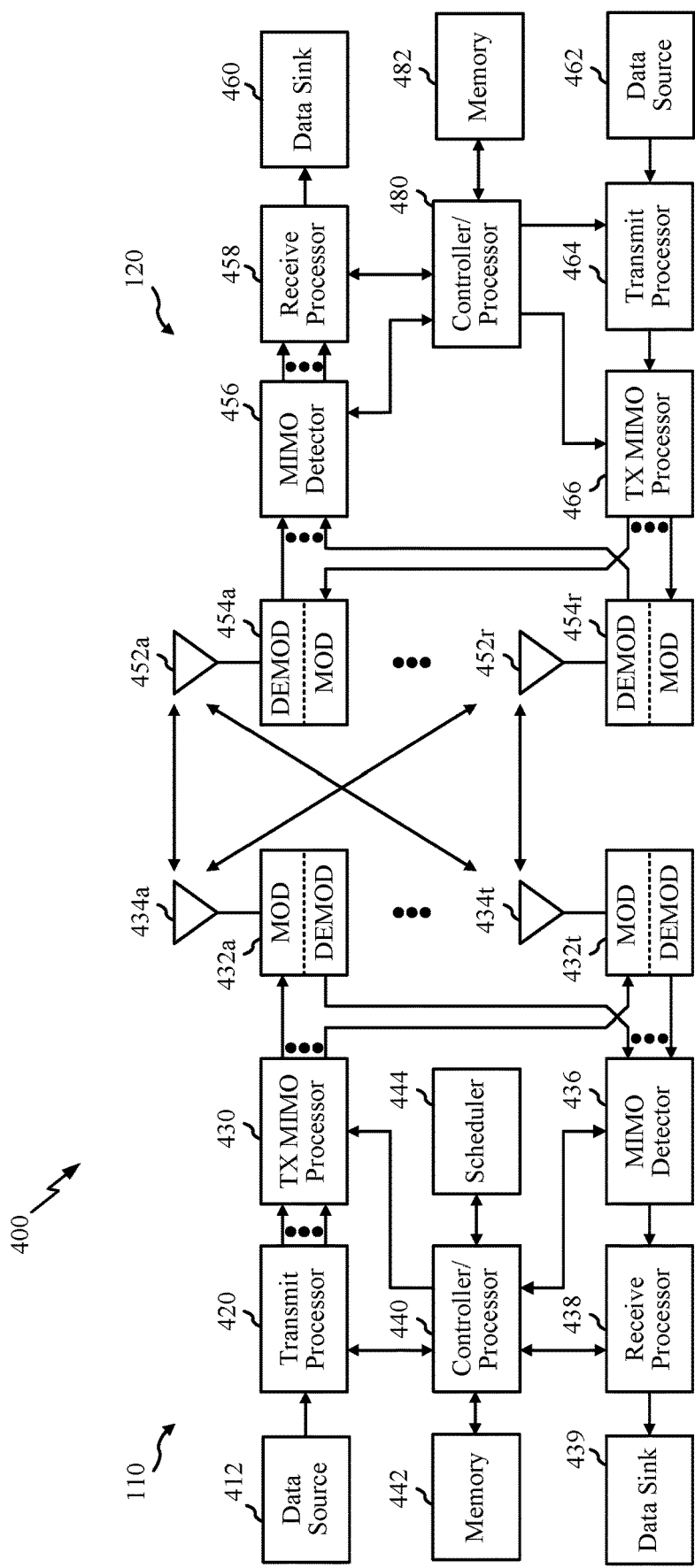
FIG. 4 is a block diagram conceptually illustrating a design of an example base station (BS) and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIG. 9.

FIG. 4 shows a block diagram of a design of a BS 110 and a UE 120, which may be one of the BSs and one of the UEs in FIG. 1. For a restricted association scenario, the BS 110 may be the macro BS 110c in FIG. 1, and the UE 120 may be the UE 120y. The BS 110 may also be a BS of some other type. The BS 110 may be equipped with antennas 434a through 434t, and the UE 120 may be equipped with antennas 452a through 452r.

At the BS 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the BS 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct processes for the techniques described herein. The processor 480 and/or other processors and modules at the UE 120 may perform or direct, e.g., the execution of the functional blocks illustrated in FIG. 9 and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
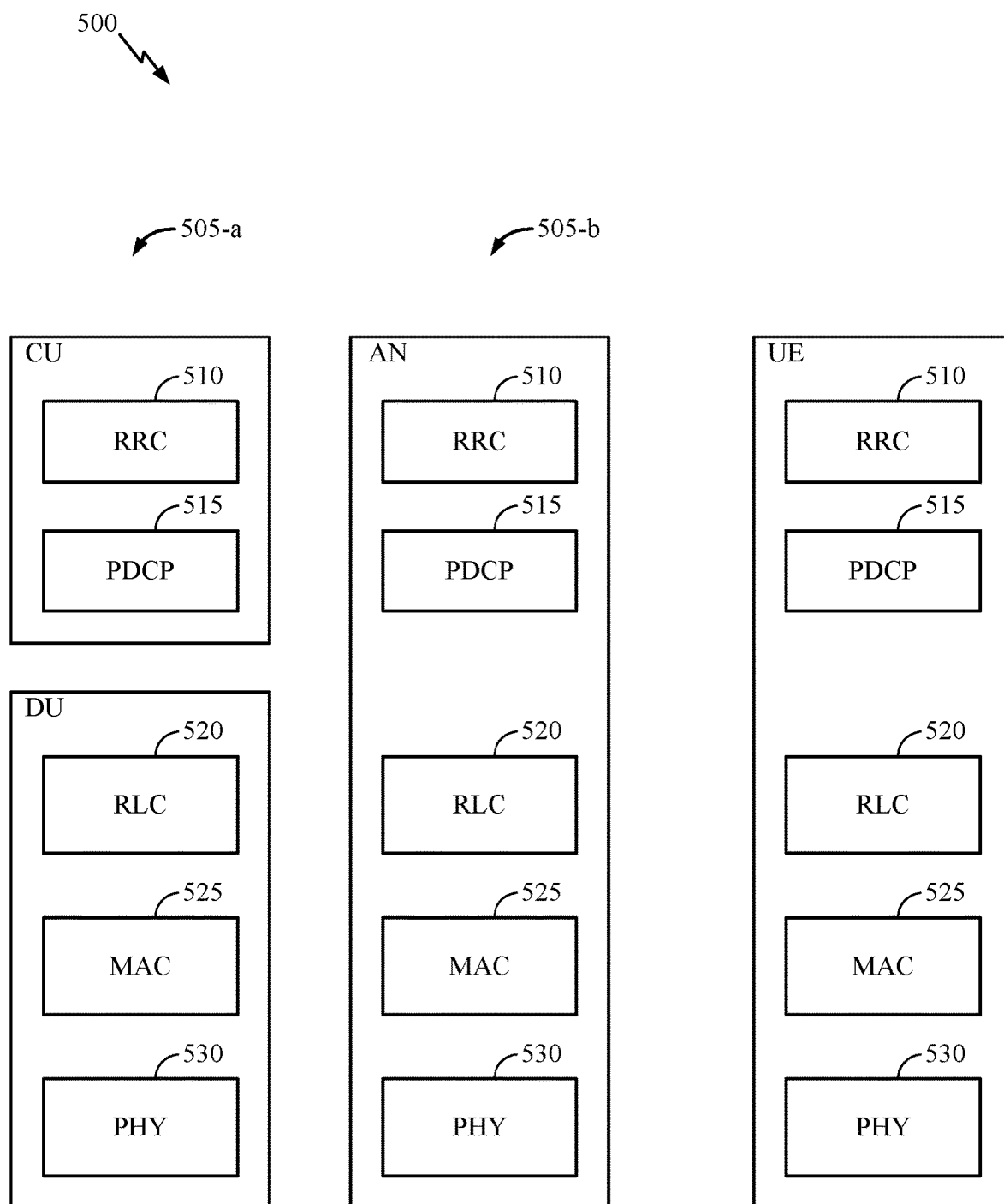
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
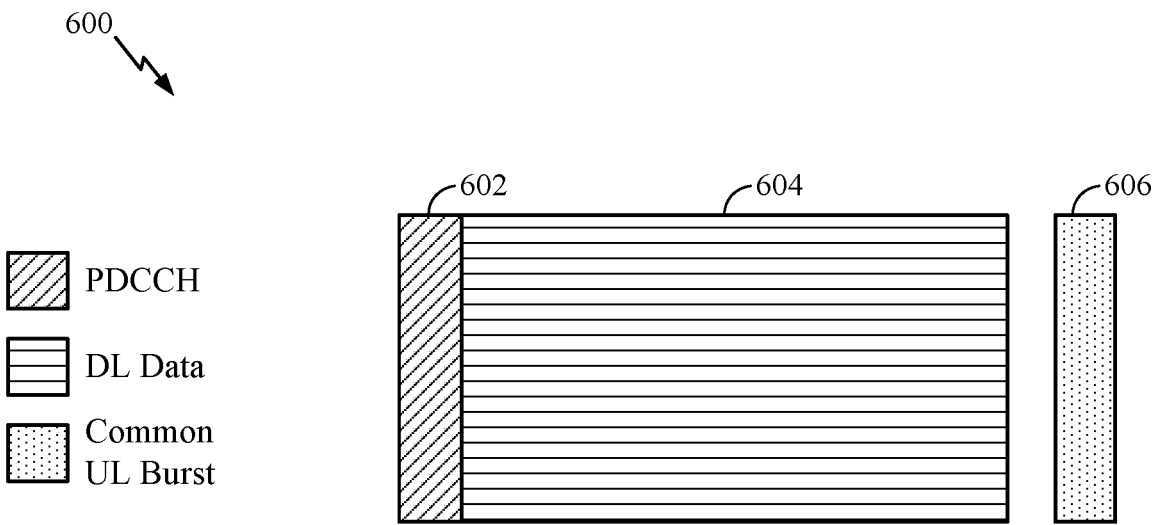
FIG. 6 illustrates an example of a downlink-centric subframe, in accordance with certain aspects of the present disclosure.

FIG. 6 is a diagram showing an example of a DL-centric subframe 600. The DL-centric subframe 600 may include a control portion 602. The control portion 602 may exist in the initial or beginning portion of the DL-centric subframe. The control portion 602 may include various scheduling information and/or control information corresponding to various portions of the DL-centric subframe 600. In some configurations, the control portion 602 may be a physical DL control channel (PDCCH), as indicated in FIG. 6. The DL-centric subframe 600 may also include a DL data portion 604. The DL data portion 604 may be referred to as the payload of the DL-centric subframe 600. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe 600 may also include a common UL portion 606. The common UL portion 606 may sometimes be referred to as an UL burst, a common UL burst, and/or various other suitable terms. The common UL portion 606 may include feedback information corresponding to various other portions of the DL-centric subframe 600. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
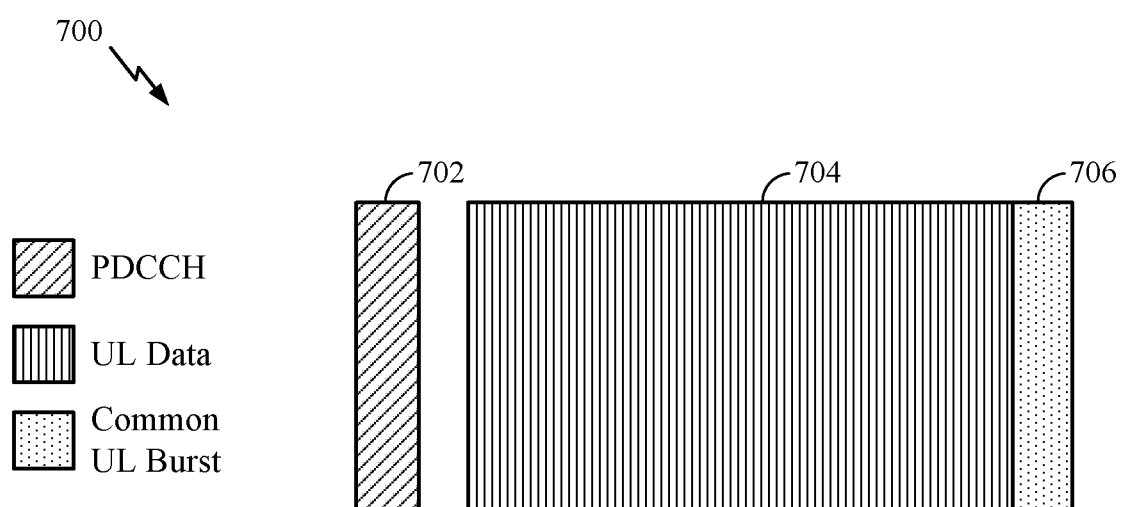
FIG. 7 illustrates an example of an uplink-centric subframe, in accordance with certain aspects of the present disclosure.

FIG. 7 is a diagram showing an example of an UL-centric subframe 700. The UL-centric subframe 700 may include a control portion 702. The control portion 702 may exist in the initial or beginning portion of the UL-centric subframe 700. The control portion 702 in FIG. 7 may be similar to the control portion 602 described above with reference to FIG. 6. The UL-centric subframe 700 may also include an UL data portion 704. The UL data portion 704 may be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a PDCCH.

As illustrated in FIG. 7, the end of the control portion 702 may be separated in time from the beginning of the UL data portion 704. This time separation may be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe 700 may also include a common UL portion 706. The common UL portion 706 in FIG. 7 may be similar to the common UL portion 606 described above with reference to FIG. 6. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Example DL/UL Assignment and Slot Format Indication

Certain wireless communication systems (e.g., 5G NR) may support different levels (e.g., hierarchies) of assignments of a transmission direction (e.g., uplink, downlink, unknown, etc.) for OFDM symbols in a time slot. For example, 5G NR may support a semi-static DL/UL assignment for transmission direction, a radio resource control (RRC) configuration implied DL/UL transmission direction, a dynamic transmission direction assignment via dynamic slot format indication (SFI) (e.g., carried in a group common (GC) PDCCH), a dynamically indicated DL/UL transmission direction via downlink and/or uplink grants, and the like.

A semi-static DL/UL assignment (e.g., from a gNB) may include a cell-specific assignment and/or a UE-specific assignment. The cell-specific assignment may be carried in system information and indicates the periodic DL/UL pattern (e.g., at the symbol level). One or two segments may be supported within each period. Within each segment, the UE may follow a DL-Unknown-UL pattern (e.g., one switching point per segment). The UE-specific assignment may further define/modify the transmission direction symbol pattern of the cell-specific assignment in a UE-specific manner. That is, for example, the unknown symbols (if any) in the cell-specific assignment can be further changed to DL or UL in a UE-specific way. The structure can support per slot DL/unknown/UL definition, but allow one DL/UL switching point per slot.

In some cases, the DL/UL transmission direction for each symbol may be implied from the RRC configuration, including the cell-specific RRC configuration and/or UE-specific RRC configuration. For example, in some cases, if the UE is RRC configured for downlink initial access for x symbols, the UE may infer that the transmission direction for those x symbols is downlink. More generally, the UE may be able to infer the transmission direction based on the channel to be used for one or more symbol(s).

Additionally, the UE may receive (e.g., after receiving the semi-static configuration) an SFI that dynamically changes one or more symbols with an unknown transmission direction to uplink/downlink. The SFI may be carried in a group common physical downlink control channel (GC-PDCCH) and may be monitored by the UE with a certain periodicity. The SFI may be defined as a fixed slot SFI table with one or more entries (e.g., 256 entries, in one example). Each entry in the SFI table may define the format of one slot. In some cases, the SFI may support a single DL/UL switching point within a slot or support two DL/UL switching points within a slot.

Additionally, in some cases, the UE may receive a grant that dynamically indicates the DL/UL transmission direction (e.g., for any remaining symbols with an unknown transmission direction). For example, the UE may receive, via downlink control information (DCI), a grant for physical downlink shared channel (PDSCH) for one or more symbols, a grant for physical uplink shared channel (PUSCH) for one or more symbols, a grant for physical uplink control channel (PUCCH) (which carries acknowledgement/non-acknowledgement (ACK/NACK) for DCI granted PDSCH) for one or more symbols, and the like.

In some cases, there may be a priority (or hierarchy) among the different UL/DL assignments. For example, the gNB and/or UE may follow a set of overwriting rules regarding which type of assignment has priority. In one example, the gNB and/or UE may follow the following priority (from highest (1) to lowest (4)) among assignment schemes: (1) semi-static DL or UL assignment; (2) dynamic indication via DCI; (3) dynamic SFI; and (4) UE specific RRC configuration implied transmission/reception. In some cases, the transmission direction implied from the cell-specific RRC configuration (e.g., SSB, RMSI coreset, PRACH, etc.) may also have the same priority as that of the semi-static DL or UL highest priority.

According to aspects, once a symbol in a given slot is assigned a transmission direction (e.g., UL or DL) via a semi-static configuration, this transmission direction may not be overwritten by another assignment scheme (e.g., DCI grant, SFI, RRC configuration implied transmission direction, etc.). Note, however, that an unknown state indicated by the semi-static DL/UL assignment may be treated as flexible (between downlink and uplink). That is, the unknown state of a symbol may be overwritten by other assignment schemes.

FIG. 8 depicts a reference example of how a transmission direction for symbols in a slot may be overwritten by one or more assignment schemes (e.g., based on an assignment priority), according to certain aspects of the present disclosure.

In this example, the UE at 802 may determine from the cell-specific semi-static assignment that the transmission direction of symbols 0-1 in the slot are downlink and that the transmission direction of symbols 2-13 is unknown. Subsequently, at 804, the UE may receive a dynamic SFI that indicates that the transmission direction of symbols 2-8 is also downlink. Subsequently, at 806, the UE may receive a PUCCH grant for the last two symbols 12-13, and determine from the PUCCH grant that the transmission direction of symbols 12-13 is uplink. In general, any symbol having an unknown state may be modified by one of the assignment schemes. However, once a symbol is given a transmission direction (e.g., uplink or downlink), that symbol may no longer be treated as having an unknown state for that slot.

Example DMRS Bundling in Slot-Aggregation

As noted above, in some cases, there may be an ambiguity regarding whether the UE is to perform DMRS bundling for one or more aggregated slots when the transmission directions of symbols in the slot can be dynamically changed. For example, 5G NR may support DMRS bundling in the time domain across one or more slots and, in particular, at least time domain bundling with slot aggregation of DL-only slots. In some cases, a DMRS pattern within the first slot may not be impacted by the time domain DMRS bundling. When the UE is configured with an aggregation-factor-DL>1, a same symbol allocation may be applied across the "aggregation-factor-DL" consecutive slots not defined as uplink by the SFI. In some cases, the aggregation factor may be 1, 2, 4, 8, etc.

Thus, when DMRS bundling is configured, the UE may perform a joint channel estimate using DMRS(s) received across aggregated slot(s), as opposed to performing a separate channel estimate for each slot based on DMRS(s) received in that slot. However, in some cases, the gNB may dynamically change the slot format (of one or more of the aggregated slots) via one of the assignment schemes described above. In such cases, the UE may not know whether to perform DMRS bundling and which slots to perform DMRS bundling for, which may significantly reduce the performance the communication system.

Thus, aspects presented herein provide techniques and apparatus for determining whether and/or how to perform DMRS bundling in situations where time-domain DMRS bundling is configured and the transmission direction of one or more symbols in the aggregated slots is dynamically changed. Specifically, in some cases, aspects enable the UE to determine, in response to detection of one or more conditions in an aggregated slot, whether the aggregated slot is still configured as a downlink-only slot. If not, the UE may refrain from bundling DMRS(s) received in that aggregated slot and/or DMRS(s) received in subsequent aggregated slots. According to aspects, while DMRS bundling generally improves the quality of channel estimation, DMRS bundling may be complex to perform if any of the one or more conditions in the aggregated slot are detected. Thus, allowing the UE to determine to refrain from DMRS bundling based on the detection of the one or more conditions reduces processing complexity at the UE, leading to power savings and improved processing time resources at the UE.

Figure 9:
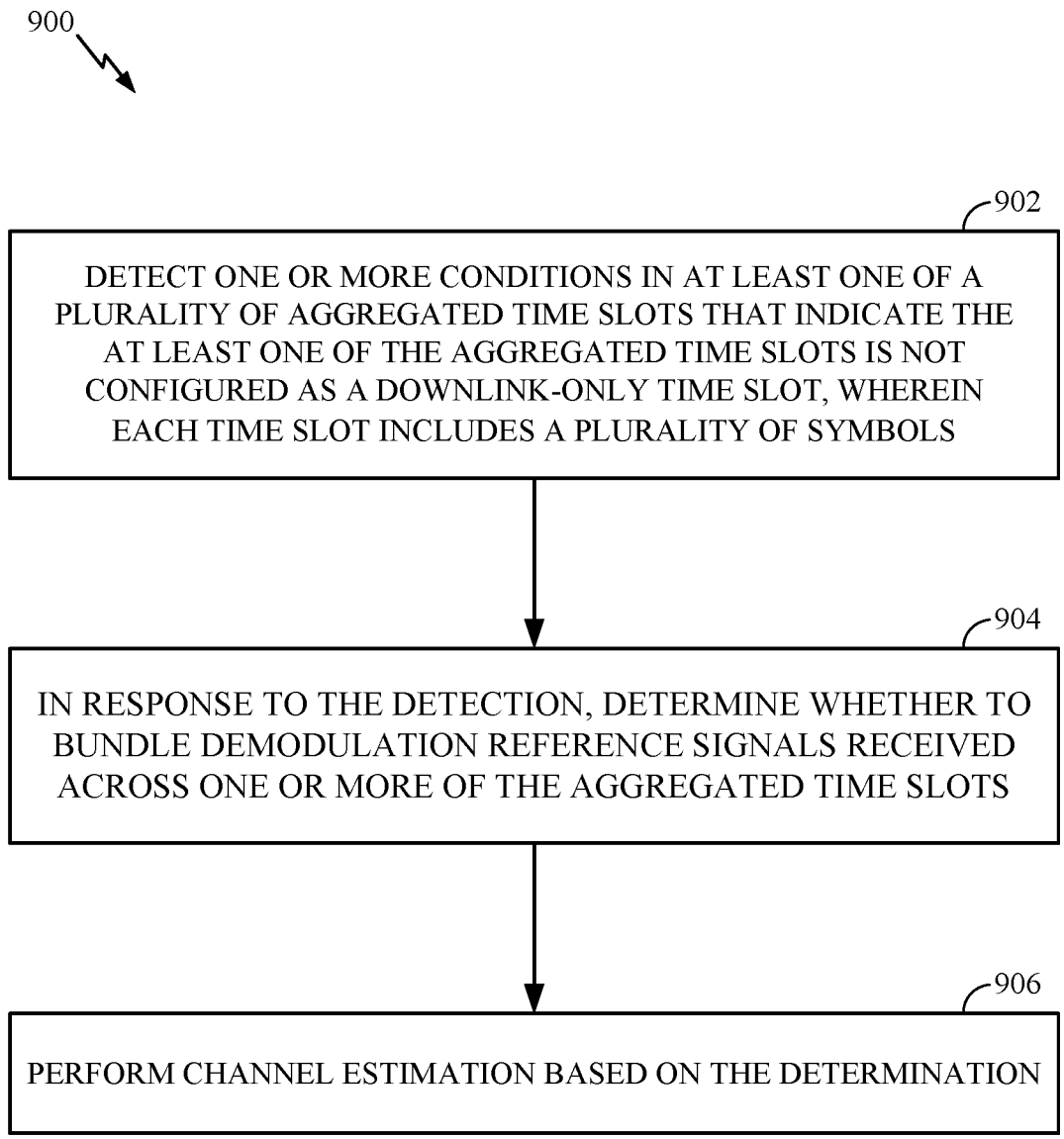
FIG. 9 illustrates example operations for wireless communications performed by a user equipment, in accordance with certain aspects of the present disclosure.

FIG. 9 illustrates example operations 900 for wireless communications, in accordance with aspects of the present disclosure. Operations 900 may be performed, for example, by a user equipment (e.g., a UE), such as UE 120 shown in FIG. 1.

Operations 900 begin, at 902, where the UE detects one or more conditions in at least one of a plurality of aggregated time slots that indicate the at least one of the aggregated time slots is not configured as a downlink-only time slot. Each time slot includes a plurality of symbols. At 904, the UE determines, in response to the detection, whether to bundle DMRSs received across one or more of the aggregated time slots. At 906, the UE performs channel estimation based on the determination.

According to certain aspects, the determination of whether to bundle DMRSs across one or more of the aggregated time slots may include determining whether to refrain from bundling DMRS(s) received in only the at least one time slot in which the one or more conditions are detected or to refrain from bundling DMRS(s) received in the at least one time slot in which the one or more conditions are detected and time slots subsequent to the at least one time slot in which the one or more conditions are detected.

According to certain aspects, the determination of whether to bundle DMRS(s) may include determining to refrain bundling DMRSs received in any of the aggregated slots. That is, for example, if the UE determines that at least one slot satisfies the condition(s), then the UE may assume that the DMRS(s) in all the slots are not to be bundled.

In one aspect, the UE may determine that time-domain DMRS bundling stops in the last DL-only slot (e.g., determined based on the one or more conditions). For example, the UE, in response to the detection, may determine to refrain from bundling DMRS(s) received in the at least one time slot in which the one or more conditions are detected and time slots subsequent to the at least one time slot in which the one or more conditions are detected. In one aspect, whether the UE refrains from bundling DMRS(s) in the last DL only slot or for additional time slots may be configurable in a UE-specific way by the gNB and/or may be based on UE capability. In some cases, the gNB may configure the UE via RRC, DCI, etc.

Figure 10:
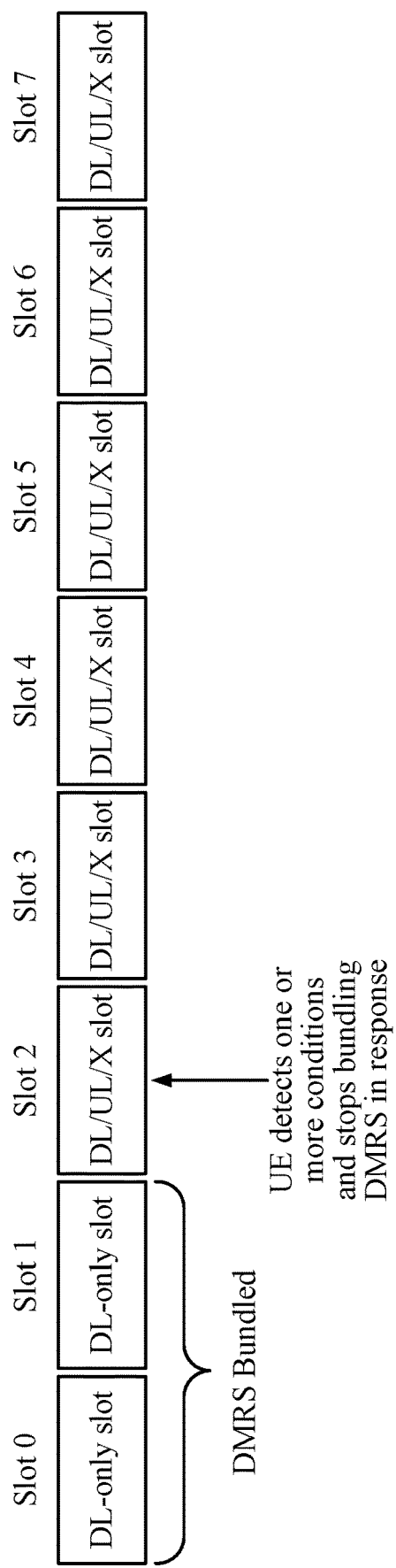
FIG. 10 illustrates an example of a UE stopping DMRS bundling in the last downlink-only slot, in accordance with certain aspects of the present disclosure.

FIG. 10 illustrates an example of the UE stopping DMRS bundling in the last downlink only slot, in accordance with certain aspects of the present disclosure. As shown, the UE may bundle DMRS(s) received in slots 0-1. The UE may then detect one or more conditions (described in more detail below) in slot 2. In response, the UE may consider slot 1 to be the last downlink only slot, and refrain from bundling DMRS(s) received in slots 2-7.

In one aspect, the UE may determine that time-domain DMRS bundling resets after the non-DL only slot finishes. That is, the UE may determine to only refrain from bundling DMRS(s) in the slot in which the condition(s) are detected.

Figure 11:
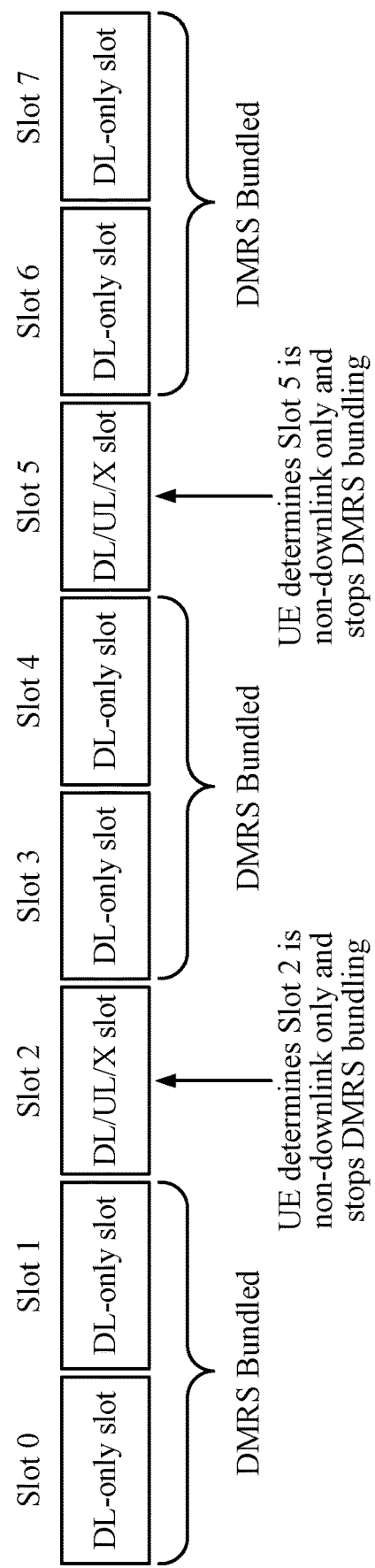
FIG. 11 illustrates an example of a UE resetting time domain DMRS bundling after the non-DL only slot finishes, in accordance with certain aspects of the present disclosure.

FIG. 11 illustrates a reference example of the UE resetting time-domain DMRS bundling after the non-DL only slot finishes. In this example, the UE may receive a grant signaling 8 slots to be aggregated, but two of the slots eventually turn out to be DL/UL slots due to change triggered by the SFI changing a symbol of X to UL in the corresponding slots.

As shown, the UE may bundle DMRS(s) received in slots 0-1. In response to detecting the condition(s) in slot 2, the UE may determine slot 2 is a non-downlink only slot and refrain from bundling DMRS(s) received in slot 2. The UE may then resume (reset) DMRS bundling in slots 3-4 (assuming conditions are not detected in those subframes), refrain from bundling DMRSs received in slot 5 (in response to detecting the condition(s) in slot 5) and resume DMRS bundling in slots 6-7 (assuming conditions are not detected in those subframes).

Figure 12:
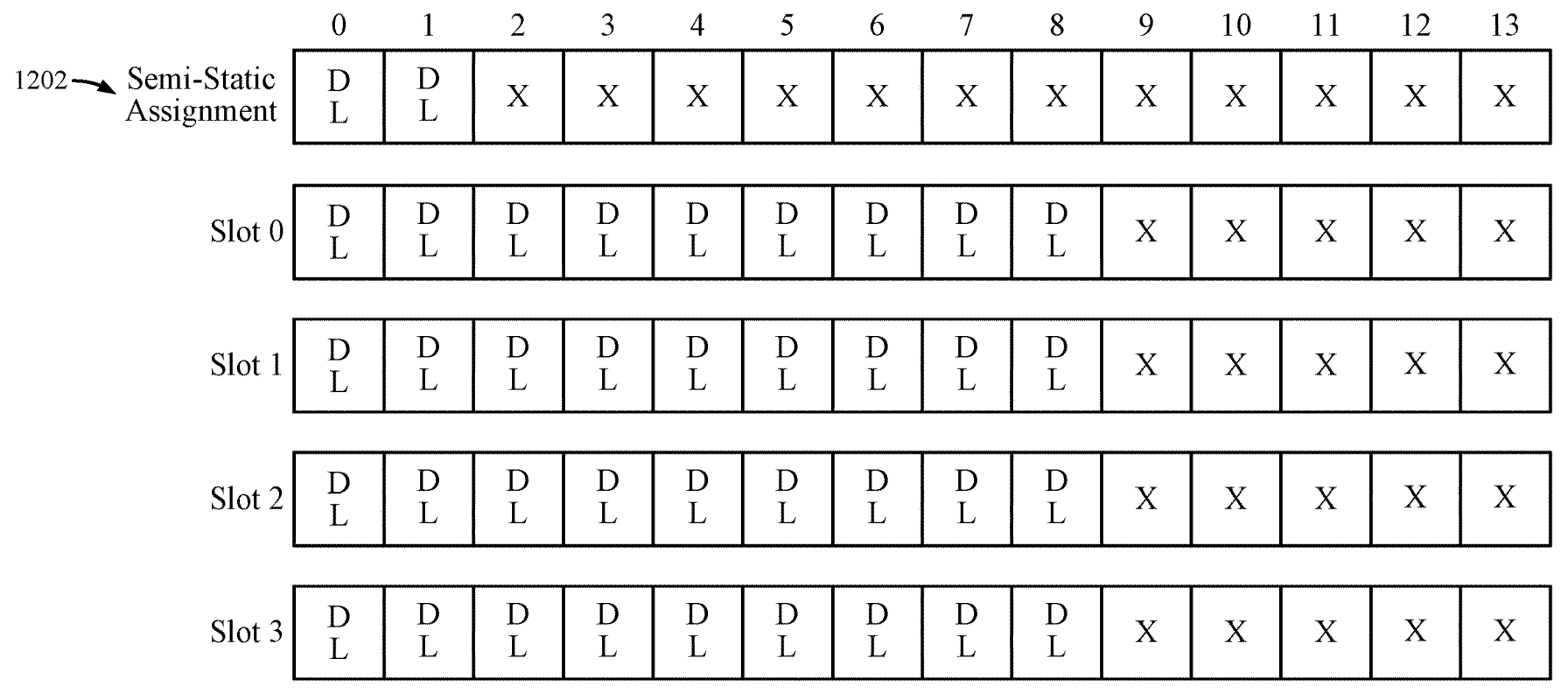

FIG. 12 illustrates an example semi-static assignment and initial slot format (e.g., based on a grant) for a UE, in accordance with certain aspects of the present disclosure. In this example, the UE may receive the semi-static assignment at 1202 as shown in FIG. 12, indicating that symbols 0-1 are downlink and that symbols 2-13 are unknown. Thereafter, the UE may then receive a grant scheduling the UE to receive DL data in symbols 2-8 of the next four slots (e.g., slots 0-3). If so, the UE may determine the slot formats shown in FIG. 12 for the four consecutive slots (e.g., slots 0-3), for example based on the grant.

In some aspects, when a UE is semi-statically configured with aggregation-factor-DL>1, and it receives a scheduling grant across aggregation-factor-DL consecutive slots, the UE may assume that the DMRSs of all the slots are time-domain bundled if and only if all symbols are "DL" or "unknown" symbols when the grant is received. Referring to the example in FIG. 12, once the UE receives the grant scheduling DL data for the next four slots, the UE may assume that slots 0-3 are time-domain bundled since all symbols in slots 0-3 are either downlink or unknown. The UE may assume that no change to "UL" of any symbol will occur during these aggregated slots.

In some aspects, the one or more conditions may include the UE determining that one of the aggregated slots (e.g., slots 0-3 in FIG. 12) has a symbol set to uplink up to the point that a downlink grant is received. That is, for example, if the UE determines, at the time that the downlink grant is received scheduling the DL data, that the UE has been configured with an uplink symbol in aggregated time slot, the UE may not consider the aggregated time slot as a downlink-only time slot.

Referring to the example slot formats in FIG. 12, assume that the UE bundles DMRS(s) received in slots 0-1 and receives another grant during slot 2 scheduling downlink data for symbols 9-10 (not shown). If, at the time the UE receives the grant in slot 2, the UE determines that another symbol (e.g., symbol 11) of slot 2 is configured for uplink, the UE may determine slot 2 is not a downlink-only subframe. Based on this determination, the UE may refrain from bundling DMRS(s) received in slots 2-3 or refrain from bundling DMRS(s) received only in slot 2.

In some aspects, the one or more conditions may include the UE determining that least one of the aggregated time slots has a symbol set to "X" up to the point that the DL grant is received. For example, if the UE determines, at the time that the downlink grant is received scheduling the DL data, that it has been configured with an symbol with an unknown state (e.g., the transmission direction is flexible), the UE may not consider the aggregated time slot as a downlink-only time slot. Based on this determination, the UE may refrain from bundling DMRS(s) received in at least the aggregated time slot.

Referring to the example slot formats in FIG. 12, assume that the UE bundles DMRS(s) received in slots 0-1 and receives another grant during slot 2 scheduling downlink data for symbols 9-10 (not shown). If, at the time the UE receives the grant, the UE determines that another symbol (e.g., symbol 11) of slot 2 has a flexible (or unknown) transmission direction, the UE may determine slot 2 is not a downlink-only subframe. Based on this determination, the UE may refrain from bundling DMRS(s) received in slots 2-3 or refrain from bundling DMRS(s) received only in slot 2.

In some aspects, the one or more conditions may include the UE determining that the DL grant assignment is not until the last OFDM symbol of the slot. For example, if after receiving a downlink grant for a first number of symbols in at least one of the aggregated time slots, the UE determines that the first number of symbols is less than a second number of symbols in the at least one aggregated time slot that had a transmission direction set to unknown prior to receiving the downlink grant, the UE may not consider the aggregated time slot as a downlink-only time slot, and therefore cannot assume that time-domain DMRS bundling is enabled.

Referring to the example slot formats in FIG. 12, in some cases, since the UE receives a downlink grant scheduling DL data in symbols 2-8, as opposed to symbols 2-13, the UE may not consider any of slots 0-3 as downlink-only slots. Based on this determination, the UE may refrain from bundling DMRS(s) received in at least slots 0-3.

In some aspects, the one or more conditions may include the UE receiving a SFI (before or after the DL grant is received) that turns any "X" symbol of the upcoming aggregated slots to an "UL" symbol. That is, if the UE receives a SFI in a first time slot of the aggregated time slots indicating that a transmission direction of at least one symbol in at least a second time slot of the aggregated time slots has changed from unknown to uplink, the UE may not consider the second time slot as a downlink-only time slot. Based on this determination, the UE may refrain from bundling DMRS(s) received in at least the second time slot Referring to the example slot formats in FIG. 12, as an example, assume that after slot 0, the UE receives an SFI during slot 1, changing a transmission direction of a symbol (e.g., symbol 9) in slot 2 to uplink. In this case, the UE may not consider slot 2 as a downlink-only subframe. Based on this determination, the UE may refrain from bundling DMRS(s) received in at least slot 2.

In some aspects, the one or more conditions may include the UE receiving an SFI (before or after the DL grant is received), and determining that one of the symbols in the aggregated time slots has an unknown transmission direction (e.g., indicating the transmission direction is flexible). Referring to the example in FIG. 12, the UE may receive an SFI in a first time slot (e.g., slot 1) of the aggregated time slots indicating a transmission direction of at least one symbol (e.g., symbols 9-10) in at least a second time slot (e.g., slot 2). If, after receiving the SFI, the UE determines that a transmission direction of at least another symbol (e.g., symbol 11 of slot 2) in the second time slot is unknown (or flexible), the UE may not consider slot 2 as a downlink-only slot. Based on this determination, the UE may refrain from bundling DMRS(s) received in at least slot 2.

In some aspects, the one or more conditions may include the UE determining that an SFI is to be monitored in at least one of the aggregated time slots or prior to at least one of the aggregated time slots. In this case, the UE may not assume time-domain DMRS bundling if an SFI is expected to be monitored. For example, referring to the example in FIG. 12, if the UE expects an SFI to be monitored for slots 0-3, the UE may not consider slots 0-3 as downlink-only slots. Based on this determination, the UE may refrain from bundling DMRS(s) received in at least time slots 0-3.

In some aspects, the one or more conditions may include the UE receiving a configuration indicating a transmission direction for each symbol in each of the aggregated time slots, and determining that a transmission direction of at least one symbol indicated in the configuration is not downlink. In this case, time-domain DMRS bundling of DL-only slot aggregation may not be assumed unless all symbols are tagged with DL from a semi-static assignment (cell-specific and/or UE specific). For example, referring to the example in FIG. 12, the UE may not consider slots 0-3 as downlink-only slots, since the semi-static assignment does not tag all symbols 0-14 as downlink.

In some aspects, time-domain DMRS bundling may be enabled for a specific set of DMRS patterns per slot. For example, there may be DMRS patterns for which the UE may not assume DMRS bundling, independent of the slot formats. That is, for example, in one case, when only front-loaded DMRS are used, the UE may determine that DMRS bundling between aggregated slots is supported. This is because, if the DMRS pattern in each slot has a high density (e.g., above a threshold), then there may not be much additional processing gain that can be expected by bundling across slots. In such cases, the one or more conditions may include the UE determining that a DMRS pattern used for at least one of the aggregated time slots is not among one or more predefined DMRS patterns associated with bundling of DMRS.

In some aspects, the one or more conditions may include the UE determining that a bandwidth is above a predefined bandwidth and/or that a rank is above a predefined rank. In some cases, the predefined bandwidth and/or rank may be a maximum bandwidth and/or rank that the UE supports when the slots are not aggregated. For example, if the rank is too large or the bandwidth is too large, DMRS bundling may result in higher complexity for the UE and thus, the UE may determine not to bundle DMRS.

In some aspects, the DMRS pattern per received port for the UE across all the aggregated slots may have to be the same in order for the UE to assume that DMRS bundling is enabled. Thus, in some cases, the one or more conditions may include the UE receiving a port associated with a first DMRS pattern in a first slot of the aggregated slots, and receiving, in a second slot of the aggregated slots, the port associated with a second DMRS pattern different from the first DMRS pattern. In one example, the UE may receive port 0 without time-domain OCC (TD-OCC) in a first slot, but in the next slot, the UE may receive port 0 with TD-OCC. In this case, the UE may not assume DMRS bundling across these two aggregated slots.

In some aspects, the transmission rank of the UE may have to be the same across all the aggregated slots in order for the UE to assume that DMRS bundling is enabled. Thus, in some cases, the one or more conditions may include the UE determining that a transmission rank of the UE in a first slot of the aggregated slots is different than a transmission rank of the UE in a second slot of the aggregated slots. In one example, if a first slot is rank 1 and a second slot is rank 2, the UE may not assume DMRS bundling across these two slots.

In some aspects, the RRC parameter "aggregation-factor-DL" might have (e.g., on top of {2,4,8}) three additional values, such as {2_bundle, 4_bundle, 8_bundle}. In such cases, the one or more conditions described herein may apply to the three additional values. However, in some cases, if {2,4,8} is set, then the UE may not assume DRMS bundling is applied across the aggregated slots.

Note that, in some aspects, any of the conditions described herein (or combination of conditions) may be based on a UE capability. For example, the particular condition(s) that the UE uses to determine whether or not a time slot is a downlink-only time slot may depend on the UE capability. Further, in some cases, the particular conditions that the UE uses may be configurable via RRC by the base station (e.g., gNB).

Figure 13A:
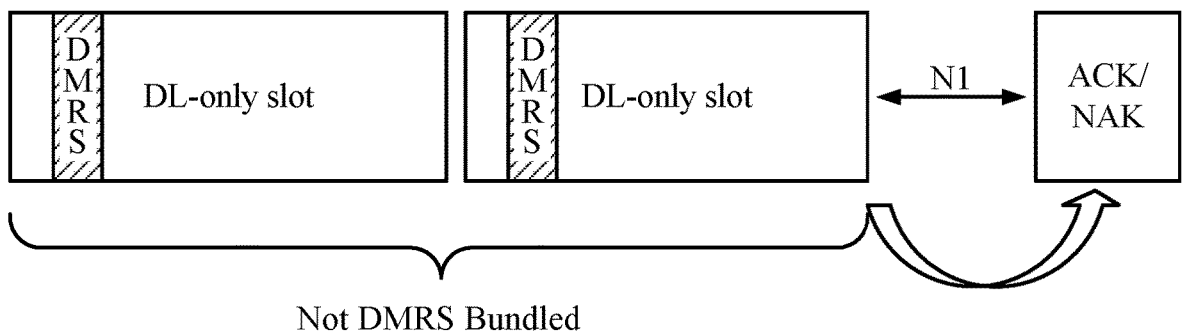
FIG. 13A illustrates an example of ACK/NACK timing when DMRS bundling is not configured, in accordance with certain aspects of the present disclosure.
Figure 13B:
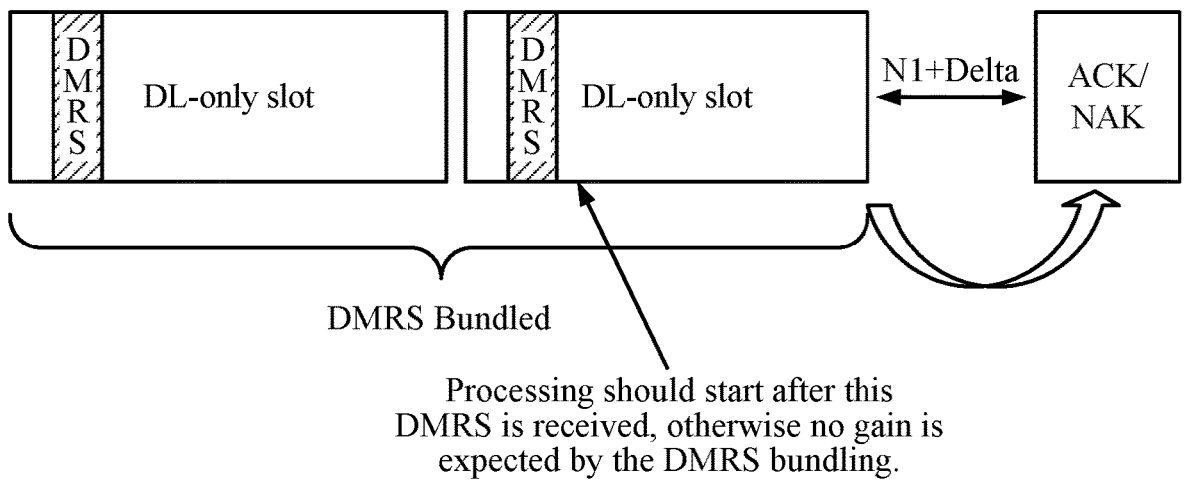
FIG. 13B illustrates an example of ACK/NACK timing when DMRS bundling is configured, in accordance with certain aspects of the present disclosure.

In some cases, when time-domain DMRS bundling is enabled, the UE may start demodulating data after the UE has received at least one of the DMRS of the subsequent slot (e.g., as shown in FIG. 13B). However, in some cases, the UE may have to adjust the timing for transmitting ACK/NACK when DMRS bundling is configured, as illustrated in FIGS. 13A and 13B and described below.

For example, FIG. 13A illustrates an example of the delay between processing DL data in one or more time slots and transmission of ACK/NACK when DMRS bundling is not configured. As shown, there may be a "K1" delay between the end of the second time slot and the transmission of ACK/NACK, where K1 is time in OFDM symbols or time is slots.

In contrast, FIG. 13B illustrates an example of the delay between processing DL data in one or more time slots and transmission of ACK/NACK when DMRS bundling is configured. As shown, compared to FIG. 13A, an additional "delta" (measured in OFDM symbols) may be added when slot aggregation with time-domain DMRS bundling is configured. In some cases, a K1 timing for the scenario of DMRS bundled aggregated DL-only slots may be introduced which may be different than that of the non-time-domain bundled slot. In some cases, the K1 timing may depend on the UE capability.

In some aspects, the ACK/NACK timing when the slots are aggregated and the DMRS of the aggregated slots are bundled may be the same as the ACK/NACK timing when DMRS is distributed, even if the DMRS in each slot is just front-loaded. For example, in some cases, each aggregated slot may have the same DMRS pattern, which may either be a front-load DMRS pattern (one or two symbols on the $3^{rd}$ or $4^{th}$ symbol of the slot), or a distributed DMRS pattern (where there are front-loaded DMRS and additional DMRS transmitted in the later part of the slot). For example, when the DMRS pattern is front-loaded, the ACK/NACK timing may be different than the ACK/NACK timing when the DMRS is distributed. Accordingly, even if the aggregated slots have front-loaded DMRS, the ACK/NACK timing may be that of the DMRS distributed plus an additional delta, which may be delta=0, depending on the UE capability.

In some aspects, the UE may determine whether to perform bundling for one or more aggregated time slots, based on the signaled ACK/NACK timing. For example, the UE may be RRC configured with a set of "K1" delays, where K1 is the amount of time (in OFDM symbols) for the UE to delay sending ACK/NACK after a time slot. Some of the K1 delays in the set may allow for bundling, and some may not allow for bundling. The UE may switch its bundling behavior based on the particular K1 that is signaled in the grant. Thus, in some aspects, the UE may refrain from bundling DMRS(s) in one or more aggregated slots if the delay for sending ACK/NACK after the aggregated slots is above a predefined threshold.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting, means for sending, means for monitoring, means for indicating, means for detecting, means for triggering and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for determining, means for bundling, means for refraining, means for estimating, means for detecting, means for decoding, means for triggering, means for reducing, means for allocating, means for monitoring, means for performing, means for indicating, means for modifying, means for identifying, means for configuring, means for supporting, means for processing, means for demodulating and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module.

Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, the instructions may include the instructions for performing the operations described herein and illustrated in FIG. 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
    detecting one or more conditions in at least one slot of a plurality of aggregated slots that indicate the at least one slot is not configured as a downlink-only slot, wherein each slot of the plurality of aggregated slots comprises a plurality of symbols, wherein the one or more conditions comprise receiving a slot format indication (SFI) in a first slot indicating that a transmission direction of at least one symbol in at least a second slot of the plurality of aggregated slots has changed from flexible to uplink;
    in response to the detection of the one or more conditions, determining whether to bundle demodulation reference signals (DMRSs) received across one or more slots of the plurality of aggregated slots, wherein determining whether to bundle the DMRSs across one or more slots of the plurality of aggregated slots comprises determining, based on the SFI indicating that the transmission direction of the at least one symbol in the second slot has changed from flexible to uplink, to:
        refrain from bundling DMRSs received in only the second slot; and
        bundle any DMRSs received in at least one of the one or more slots of the plurality of aggregated slots prior to the second slot or one or more slots of the plurality of aggregated slots subsequent to the second slot; and
    performing channel estimation based on the determination of whether to bundle the DMRSs received across the one or more slots of the plurality of aggregated slots.

2. The method of claim 1, wherein:
    the one or more conditions are further based on a capability of the UE.

3. The method of claim 1, wherein performing the channel estimation comprises performing a joint channel estimation based on the bundled DMRS s.

4. The method of claim 1, wherein the one or more conditions comprise:
    receiving a grant that schedules the plurality of aggregated slots; and
    determining, based, at least on the received grant, that a transmission direction for at least one symbol in the at least one slot of the plurality of aggregated slots is an uplink transmission direction or a flexible transmission direction, wherein:
        the flexible transmission direction indicates that the transmission direction can be uplink or downlink; and
    wherein the determining whether to bundle DMRSs received across one or more of the aggregated slots comprises determining not to bundle the DMRSs received across one or more of the aggregated slots based on the uplink transmission direction or the flexible transmission direction.

5. The method of claim 1, wherein:
    the one or more conditions comprise receiving a downlink grant for a first number of symbols in the at least one slot of the plurality of aggregated slots;
    the first number of symbols is less than a second number of symbols in the at least one slot of the plurality of aggregated slots that had a transmission direction set to flexible prior to receiving the downlink grant.

6. The method of claim 1, further comprising receiving a downlink grant for the first slot, wherein the SFI is received before or after the downlink grant is received.

7. The method of claim 1, wherein:
    determining, after receiving the SFI, that a transmission direction of at least another symbol in at least the second slot is flexible, wherein a flexible transmission direction indicates that the transmission direction can be uplink or downlink.

8. The method of claim 7, further comprising receiving a downlink grant for the first slot, wherein the SFI is received before or after the downlink grant is received.

9. The method of claim 1, wherein the one or more conditions comprise determining that the SFI is to be monitored in the at least one slot of the plurality of aggregated slots or prior to the at least one slot of the plurality of aggregated slots.

10. The method of claim 1, wherein the one or more conditions comprise:
receiving a configuration indicating a transmission direction for each symbol in each slot of the plurality of aggregated slots; and
determining that a transmission direction of at least one symbol indicated in the configuration is not downlink.

11. The method of claim 1, wherein the one or more conditions comprise determining that a DMRS pattern used for at the least one slot of the plurality of aggregated slots is not among one or more predefined DMRS patterns associated with bundling of DMRS.

12. The method of claim 1, wherein the one or more conditions comprise determining at least one of:
a bandwidth configured for the UE is above a threshold bandwidth; or
a rank configured for the UE is above a threshold rank.

13. The method of claim 1, further comprising:
after performing the channel estimate, processing data received in the one or more slots of the plurality of aggregated slots; and
after an amount of time has elapsed, sending feedback regarding the received data, wherein the amount of time is based on at least one of:
whether DMRSs received in the one or more slots of the plurality of aggregated slots have been bundled;
a capability of the UE; or
a DMRS pattern used in the one or more slots of the plurality of aggregated slots, wherein the amount of time for a first DMRS pattern is equal to an amount of time for a second DMRS pattern.

14. The method of claim 1, further comprising determining whether to bundle the DMRSs received in the one or more slots of the aggregated slots based on an amount of time to delay after the plurality of aggregated slots before sending feedback.

15. The method of claim 14, wherein determining whether to bundle the DMRSs comprises determining to refrain from bundling the DMRSs if the amount of time to delay is above a threshold amount of time.

16. The method of claim 14, further comprising receiving the amount of time to delay via radio resource control (RRC) signaling.

17. The method of claim 1, wherein the one or more conditions comprise:
receiving a port associated with a first DMRS pattern in a first slot of the plurality of aggregated slots; and
receiving, in a second slot of the plurality of aggregated slots, the port associated with a second DMRS pattern different from the first DMRS pattern.

18. The method of claim 1, wherein the one or more conditions comprise:
determining that a transmission rank of the UE in a first slot of the plurality of aggregated slots is different from a transmission rank of the UE in a second slot of the plurality of aggregated slots.

19. The method of claim 1, wherein the one or more conditions comprise:
receiving a parameter indicating a number of the plurality of aggregated slots; and
determining that the number of the plurality of aggregated slots does not belong to a set of values to which DMRS bundling applies.

20. An apparatus for wireless communication by a user equipment (UE), comprising:
at least one processor configured to:
detect one or more conditions in at least one slot of a plurality of aggregated slots that indicate the at least one slot is not configured as a downlink-only slot, wherein each slot of the plurality of aggregated slots comprises a plurality of symbols, wherein the one or more conditions comprise receiving a slot format indication (SFI) in a first slot indicating that a transmission direction of at least one symbol in at least a second slot of the plurality of aggregated slots has changed from flexible to uplink;
in response to the detection of the one or more conditions, determine whether to bundle demodulation reference signals (DMRSs) received across one or more slots of the plurality of aggregated slots, wherein the at least one processor is configured to determine whether to bundle the DMRSs across one or more slots of the plurality of aggregated slots by determining, based on the SFI indicating that the transmission direction of the at least one symbol in the second slot has changed from flexible to uplink, to:
refrain from bundling DMRSs received in only the second slot; and
bundle any DMRSs received in at least one of the one or more slots of the plurality of aggregated slots prior to the second slot or one or more slots of the plurality of aggregated slots subsequent to the second slot; and
perform channel estimation based on the determination of whether to bundle the DMRSs received across the one or more slots of the plurality of aggregated slots; and
a memory coupled with the at least one processor.

21. An apparatus for wireless communication by a user equipment (UE), comprising:
means for detecting one or more conditions in at least one slot of a plurality of aggregated slots that indicate the at least one slot is not configured as a downlink-only slot, wherein each slot of the plurality of aggregated slots comprises a plurality of symbols, wherein the one or more conditions comprise receiving a slot format indication (SFI) in a first slot indicating that a transmission direction of at least one symbol in at least a second slot of the plurality of aggregated slots has changed from flexible to uplink;
means for, in response to the detection of the one or more conditions, determining whether to bundle demodulation reference signals (DMRSs) received across one or more slots of the plurality of aggregated slots, wherein the means for determining whether to bundle the DMRSs across one or more slots of the plurality of aggregated slots comprise means for determining, based on the SFI indicating that the transmission direction of the at least one symbol in the second slot has changed from flexible to uplink, to:
refrain from bundling DMRSs received in only the second slot; and bundle any DMRSs received in at least one of the one or more slots of the plurality of aggregated slots prior to the second slot or one or more slots of the plurality of aggregated slots subsequent to the second slot; and means for performing channel estimation based on the determination of whether to bundle the DMRSs received across the one or more slots of the plurality of aggregated slots.

22. A non-transitory computer-readable medium for wireless communication by a user equipment (UE), comprising: instructions that, when executed by at least one processor, configure the at least one processor to:

detect one or more conditions in at least one slot of a plurality of aggregated slots that indicate the at least one slot is not configured as a downlink-only slot, wherein each slot of the plurality of aggregated slots comprises a plurality of symbols, wherein the one or more conditions comprise receiving a slot format indication (SFI) in a first slot indicating that a transmission direction of at least one symbol in at least a second slot of the plurality of aggregated slots has changed from flexible to uplink;

in response to the detection of the one or more conditions, determine whether to bundle demodulation reference signals (DMRSs) received across one or more slots of the plurality of aggregated slots, wherein the instructions that cause that at least one processor to determine whether to bundle the DMRSs across one or more slots of the plurality of aggregated slots comprise instructions that cause that at least one processor to determine, based on the SFI indicating that the transmission direction of the at least one symbol in the second slot has changed from flexible to uplink, to:

refrain from bundling DMRSs received in only the second slot; and bundle any DMRSs received in at least one of the one or more slots of the plurality of aggregated slots prior to the second slot or one or more slots of the plurality of aggregated slots subsequent to the second slot; and perform channel estimation based on the determination of whether to bundle the DMRSs received across the one or more slots of the plurality of aggregated slots.

* * * * *